(12) United States Patent
Zaharakis et al.

(10) Patent No.: US 8,888,058 B2
(45) Date of Patent: Nov. 18, 2014

(54) STAND WITH HANDS FREE WIRE MANAGEMENT

(76) Inventors: Konstandinos Zaharakis, Bethlehem, PA (US); Steven Zaharakis, Bethlehem, PA (US)

( * ) Notice: Subject to any disclaimer, the term of this patent is extended or adjusted under 35 U.S.C. 154(b) by 120 days.

(21) Appl. No.: 13/199,850

(22) Filed: Sep. 9, 2011

(65) Prior Publication Data

US 2012/0145835 A1 Jun. 14, 2012

Related U.S. Application Data

(60) Provisional application No. 61/403,163, filed on Sep. 10, 2010.

(51) Int. Cl.
*F16M 11/00* (2006.01)
(52) U.S. Cl.
USPC ......... 248/176.1; 248/300; 248/459; 248/918

(58) Field of Classification Search
USPC .............. 248/917, 918, 300, 454, 459, 176.1; 361/679.01
See application file for complete search history.

(56) References Cited

U.S. PATENT DOCUMENTS

| | | | | |
|---|---|---|---|---|
| D244,331 | S | * | 5/1977 | Woods ........................... D18/12 |
| 5,080,316 | A | * | 1/1992 | MacEwan ..................... 248/459 |
| 5,358,208 | A | * | 10/1994 | Moseley et al. ............. 248/441.1 |
| D559,850 | S | * | 1/2008 | Lye ............... D14/447 |
| D670,296 | S | * | 11/2012 | Seehoff ........................ D14/447 |
| D689,478 | S | * | 9/2013 | Wikel et al. .................. D14/253 |
| 2012/0170212 | A1 | * | 7/2012 | Gallouzi et al. ......... 361/679.56 |

* cited by examiner

*Primary Examiner* — Amy J. Sterling
(74) *Attorney, Agent, or Firm* — G Kenneth Smith

(57) ABSTRACT

The present invention relates to apparatus and methods for a stand for portable electronic devices, including electronic devices with built in displays, such as mobile telephones, media players and tablet computers and e-readers.

11 Claims, 29 Drawing Sheets

STAND WITH HANDS FREE WIRE MANAGEMENT

This application is a non-provisional application which claims the benefit of U.S. Provisional Application No. 61/403,163 filed Sep. 10, 2010.

BACKGROUND OF THE INVENTION

Many electronic manufacturers use proprietary power and communication interfaces for portable electronic devices. Many docking stations use proprietary stationary connectors that protrude from a depression in the docking station and thus can only be utilized by compatible devices. The fixed geometry of such devices also may limit their utilization to specific devices. Frequently. devices such as e-readers, mobile phones, portable computers and other portable electronic devices are enveloped by protective or ornamental coverings that alter their geometry such that even the specific docking stations designed to interface with the devices are unable to be utilized. Docking devices with fixed connectors also may limit the ability of the docking station to accommodate a matched device in an orientation other than that where the connectors match (e.g. portrait or landscape).

Alternatively there are docking stations or device stands that provide no wire management, but rather provide support for a portable electronic device where wires are free to move wherever the user desires. These docking stations or device stands with wire management systems often utilize openings in the stand or docking station so that wires can often be "fished" through the stand and connected to the device. In many cases, removing the device from the device stand or docking station is difficult, as the wires connected to the device need to be disconnected to remove the portable electronic device from the stand. As a result, the wire is often dedicated to the stand in order to avoid the need for fishing it in and out of the device. This may necessitate the purchase of another wire if a user wants to use the portable electronic device outside of the stand.

In addition, many docking stations or device stands offer a fixed viewing angle with no mechanism for adjustment of the viewing angle. Minute angle adjustments may improve the viewing angle based on the users needs.

As a result, it would be desirable to have a docking station/stand which is universal in nature. That allows multiple devices of varying size and/or proprietary connectors to be placed on it in various orientations. that have a more functional connector, and permits the device to be placed in or removed from the stand even when the wire is attached to the device. It is desirable that the stand permit various viewing angles.

SUMMARY OF THE INVENTION

The present invention relates to apparatus and methods for a stand for portable electronic devices, including devices with built in displays, such as mobile telephones, media players, tablet computers and e-readers (e.g. Apple iPod®, iPhone®, iPad®, Barnes & Noble Nook®, Amazon Kindle®). More particularly, the present invention relates to device stands or docking stations that provide a means for managing connector cables and/or other wiring that can be connected to portable electronic devices. The present invention provides a wire management channel that permits the placement and removal of portable electronic devices without the need for removal of wires that are connected to the electronic device. As described herein the "wire management channel" is any opening in the stands of the present invention that permits the placement in or removal of a portable electronic device from the stand without removing the wires connected to the portable electronic device.

Additionally the stands of the present invention may include a mechanism for adjusting the viewing angle such as by the use of a sliding backrest. The stands of the present invention may also include one or more custom connector(s) that may be inserted into the wire management channel.

Mobile telephones, media players, tablet computers and other electronic devices often are used to play games, watch videos, view pictures, access the Internet and do general computing. Although these devices may be handheld, they are commonly used as display devices/monitors and as such may be set in a docking station or device stand for display/viewing purposes.

FIGURES

DETAILED DESCRIPTION OF THE INVENTION

The present invention relates to apparati and methods for a stand for portable electronic devices, more particularly to devices with built in displays, such as cellular telephones, media players and tablet PCs and e-readers (e.g. Apple iPod®, iPhone®, iPad®, Barnes & Noble Nook®, Amazon Kindle®). The stands of the present invention enable the management of wire connections to the electronic devices while the device is placed upon the stand or removed from the stand. The stands of the present invention may also include mechanisms that permit varying the angle of viewing of the electronic device when placed in the stand. The terms "stand", "dock" and "docking station" are used interchangeably herein and refer to a device on which a portable electronic device can be placed.

Figure 1:
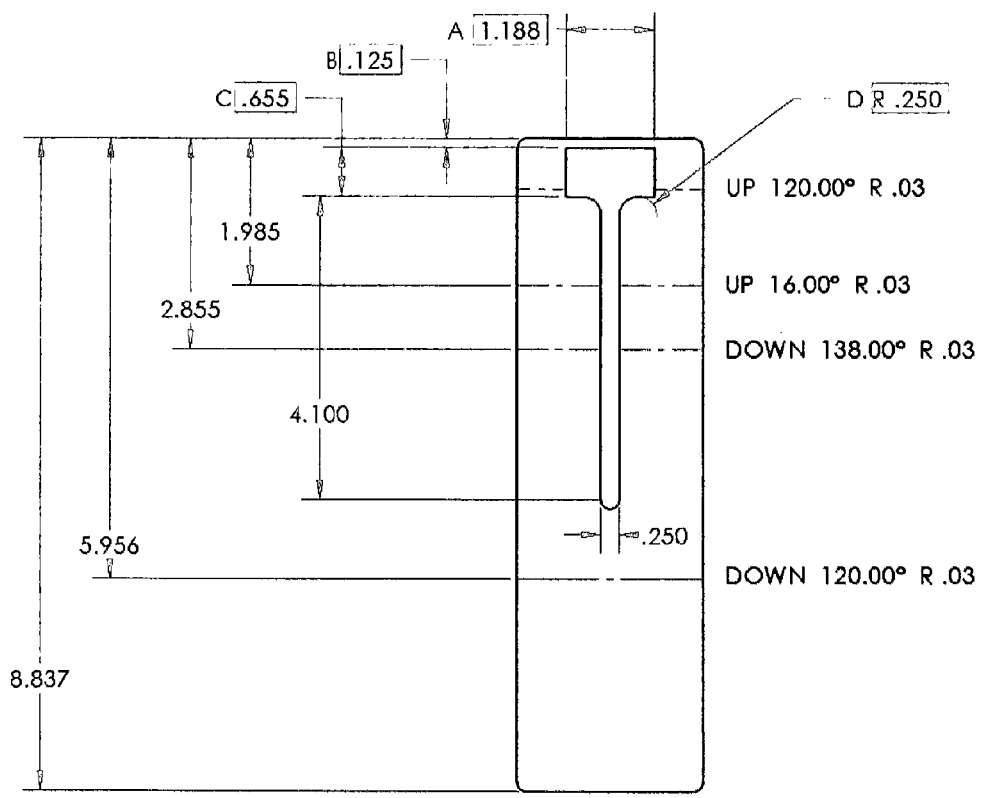
FIG. 1 is a schematic drawing of one embodiment of the devices of the present invention that illustrates the dimensions and openings.
Figure 2A:
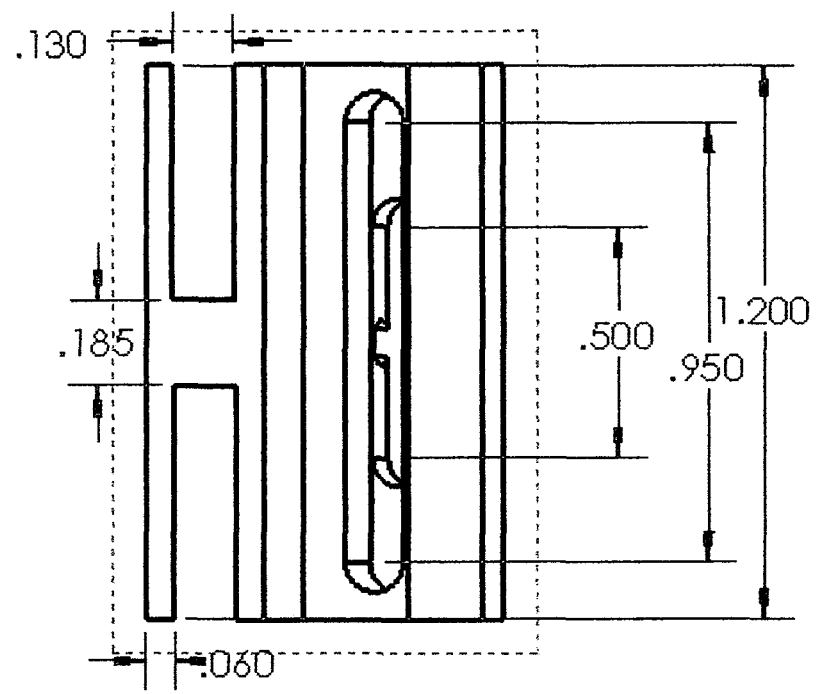
FIG. 2 is a schematic drawing of one embodiment of a dock connector.
Figure 2B:
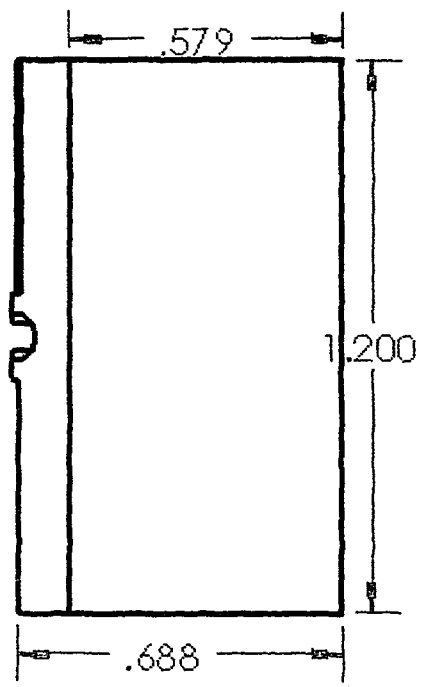
Figure 2C:
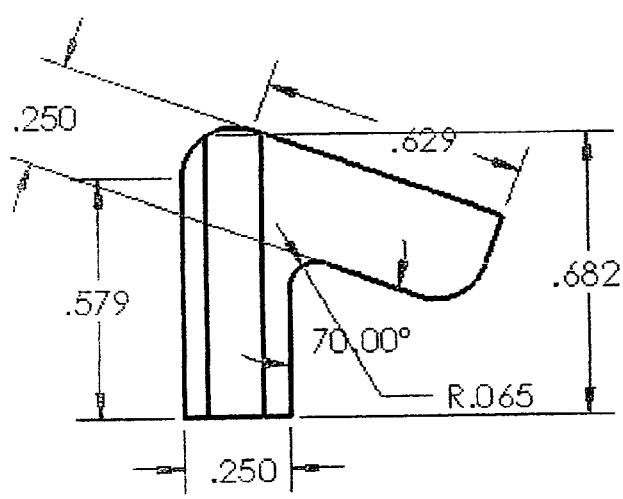
Figure 2D:
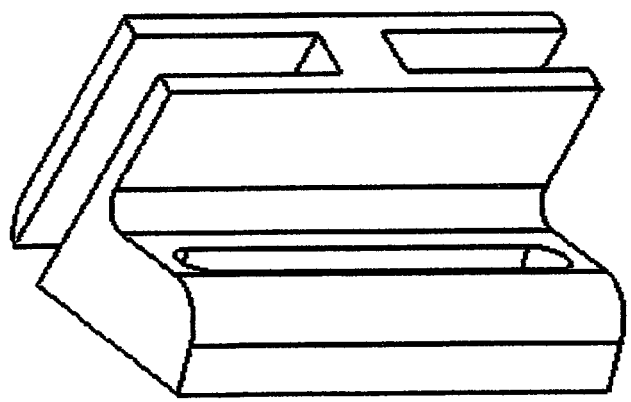
Figure 3A:
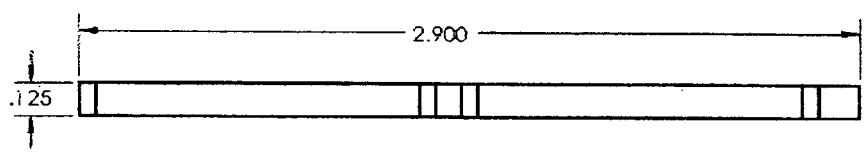
FIG. 3 is a schematic drawing of one embodiment of a single view adjuster.
Figure 3B:
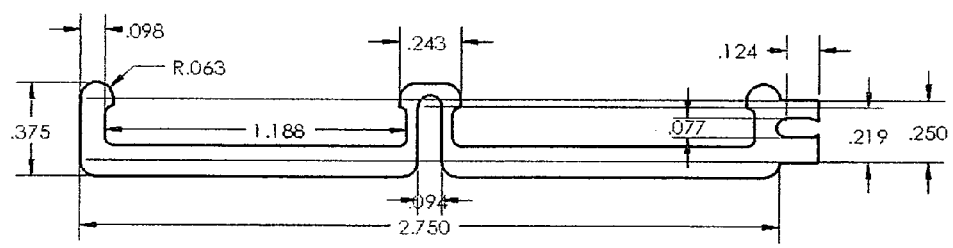
Figure 4A:
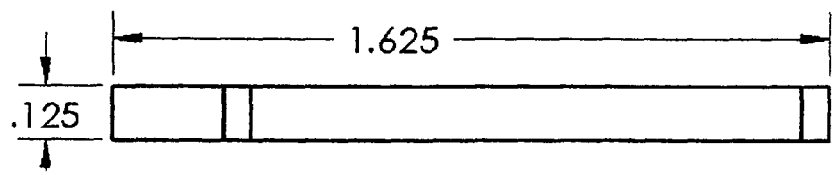
FIG. 4 is a schematic drawing of one embodiment of a double view adjuster.
Figure 4B:
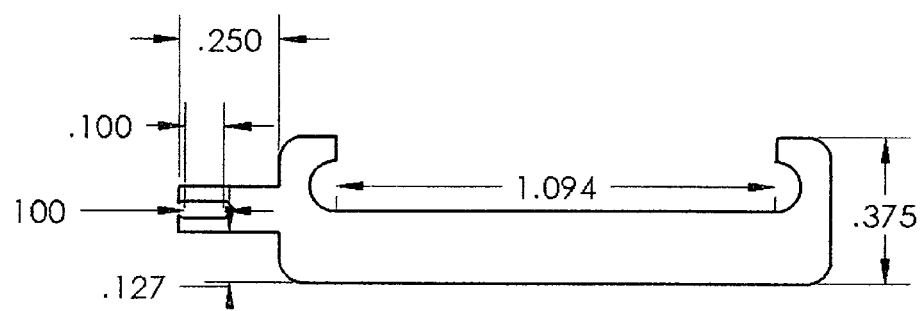

FIG. 1 provides an example of one embodiment of the present invention. In this embodiment the stand is made from a single piece of aluminum approximately 0.13 inches in thickness. A "T" cutout as shown in FIG. 1 is cut from one end of the aluminum piece and the piece of aluminum is bent at a variety of sites to provide a stand with the dimensions shown in FIG. 1. The "T" cutout permits wires connected to portable devices to be inserted or removed from the stand when the portable device is inserted into or removed from the stand. Thus, the stand permits the device to be inserted and removed without having to disconnect and reconnect the device from its cables or connectors. Therefore, the stand does not require a dedicated cable. The stand and the "T" cutout can be sized to accommodate the varying geometry and sizes of portable electronic devices and for optimal connection to various handheld electronic devices.

In a preferred embodiment the stand is made from a single piece of metal, preferably aluminum having a length from about 7.5 inches to about 12 inches, a width from about 1.5 inches to about 5 inches and a thickness of from about 1/16 inches to about 3/8 inches. In a preferred embodiment the metal piece is bent such that there are five faces or aspects to the stand. While metal is preferred, the stand can be made from any material that is sufficiently sturdy to withstand the pressure placed upon it from the portable electronic device.

Preferably, the top of the "T" cutout has a width sufficient to accommodate the widest connector of any device the dock will be used to hold and is positioned to accommodate these devices. In FIG. 1, this dimension is labeled as A and has a size of 1.188 inches. Typically the range for dimension A is from about 0.25 to about 2 inches.

Figure 14:
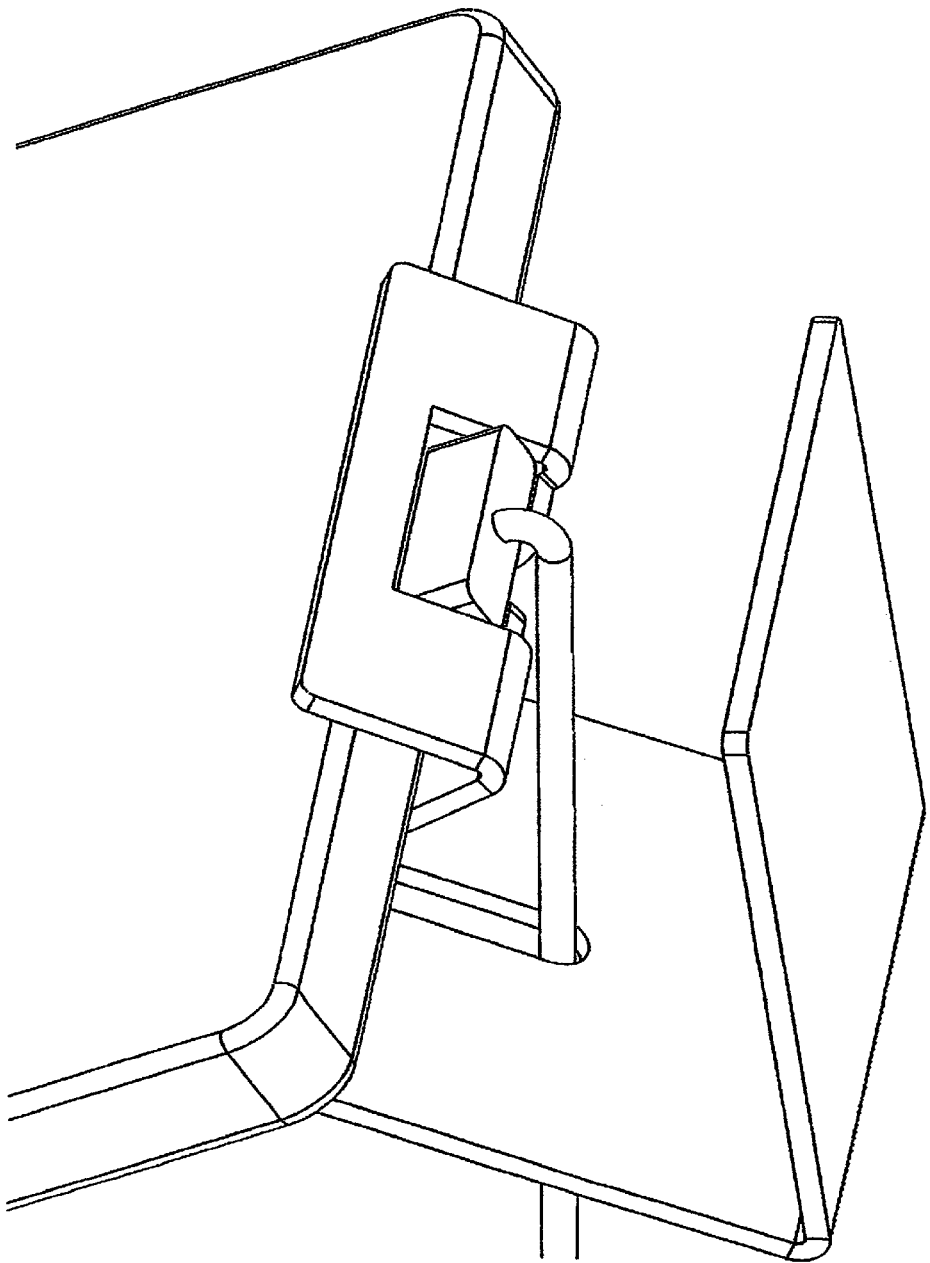
FIG. 14 illustrates a bottom-up view of one embodiment of the stand which depicts the use of the "hands free" wire management system.

In certain embodiments the T cutout does not remove all of the material from one end of metal piece. This is indicated by the B dimension in FIG. 1 where 0.125 inches remains between the end of the metal piece and the T cutout. In preferred embodiments the range for B is 0 inches to about 0.5 inches. In other embodiments distance B is 0 and thus the T cutout would reach the outer edge of the dock, in other words eliminating the piece at the end of the metal piece. In this embodiment the stand has two supports on which the portable electronic device can rest, one on either side of the T cut out. In this embodiment support is provided to the docked device when it is connected through its cable as shown in FIG. 14.

Referring to FIG. 1, dimension C can be varied in different embodiments of the stand to provide the flexibility to accept devices with varying thicknesses and connector locations. Varying this dimension also allows the variation of the view angle by tilting the inserted device manually or through the use of a view adjustor, a device for altering the angle described in more detail below. In a preferred embodiment dimension C is about 0.655 inches, but can range from about 0.2 to about 1 inch.

Referring to FIG. 1, a preferred embodiment of the stand has a dimension D radius of about 0.25 inches, but the range may be from about 1/16 to about 1/2 inch. This dimension should be wide enough to accommodate the widest wire that will used to connect to the portable electronic device. This slot is used to guide the wire of any connected device out of the T slot without getting stuck. The slot also aides in guiding the insertion of the dock connector.

While a T cutout is a preferred embodiment of the wire management system other shapes and sizes of the cutout that accommodate the electronic devices and their connectors and wires are also envisioned in the stands of the present invention.

Figure 5:
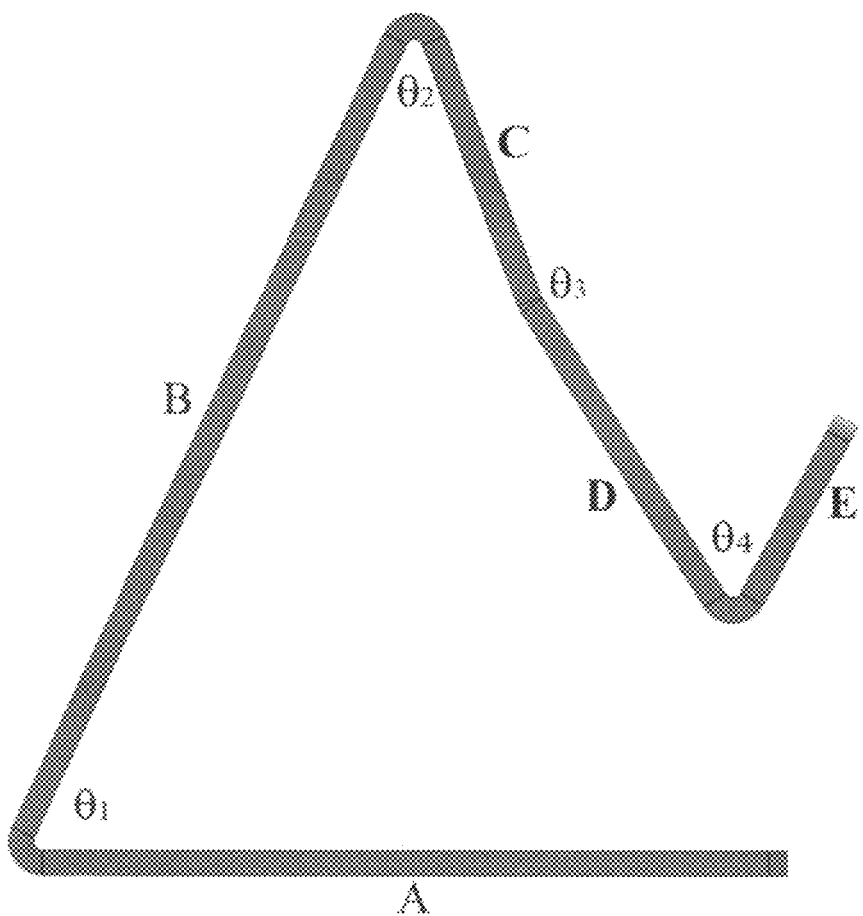
FIG. 5 is an illustration of the geometry of a dock.

Referring to FIG. 5, the first face A serves as the base of the stand. Face B is the back of the stand and is contiguous with face A. Face B describes an angle $\theta_1$ relative to face A and is from about 45 degrees to about 70 degrees relative to the face A. Faces C, D and E serve as the portion of the stand on which the portable electronic device is placed. Face C is contiguous with face B and describes an angle $\theta_2$ of about 35 degrees to about 70 degrees relative to face B. Face D is contiguous with face C and describes an angle $\theta_3$ of about 150 degrees to about 180 degrees relative to face C. Face E is contiguous with face D and describes an angle $\theta_4$ of about 45 degrees to about 70 degrees relative to face D. The angle between face C and face D may be variable depending on the shape (e.g. curvature) of the electronic device to be placed in the stand. Face E serves to keep the portable electronic device resident in the stand from sliding off the stand and the angle between face D and face E can be adjusted accordingly. The length of face E determines the range of viewing angle achievable.

The angles and the dimension of the stand may be adjusted to accommodate any portable electronic device. In a preferred embodiment the stand is made from a single piece of metal, preferably aluminum having a length of about 8.8 inches, a width of about 2.5 inches and a thickness of about 1/8 inches. Face B is contiguous with face A and describes an angle $\theta_1$ of about 60 degrees relative to the face A. Face C is contiguous with face B and describes an angle $\theta_2$ of about 42 degrees relative to face B. Face D is contiguous with face C and describes an angle $\theta_3$ of about 164 degrees relative to face C. Face E is contiguous with face D and describes an angle $\theta_4$ of about 60 degrees relative to face D.

Figure 6:
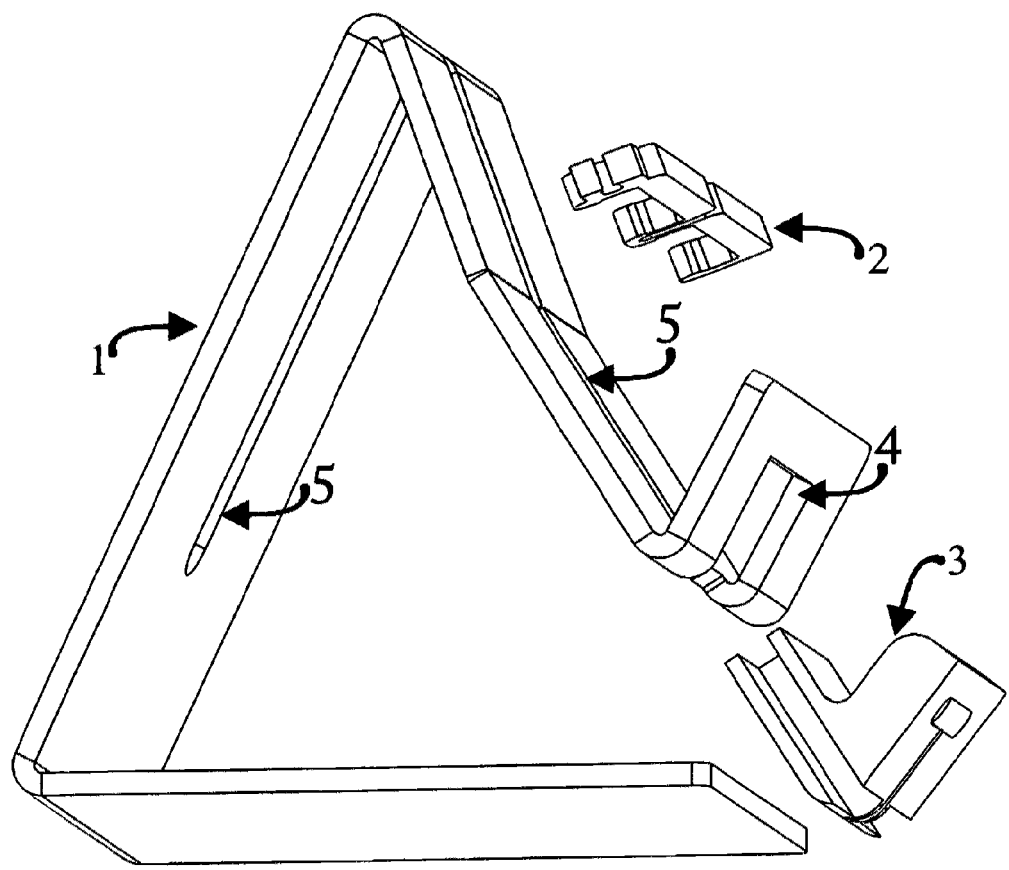
FIG. 6 shows an exploded view of the stand and its two auxiliary devices.
Figure 7:
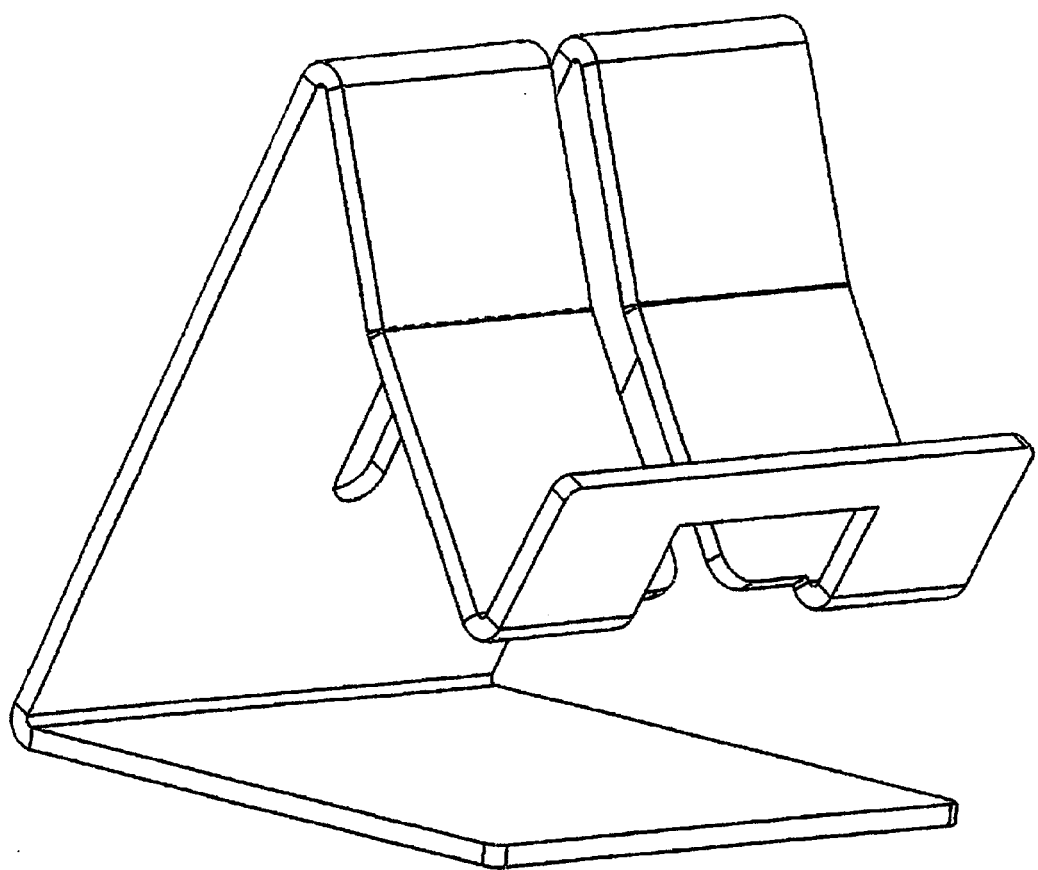
FIG. 7 illustrates an isometric view of one embodiment of the stand.

The wire management channel may be any configuration that permits the insertion and removal of a portable electronic device from the stand without connection or disconnection of the cords (e.g. power cord) from the electronic device. In a preferred embodiment the wire management channel may be an opening cut into the stand. Referring to FIG. 6, the wire management channel (5) is an opening that has been cut into faces B, C, D and E to facilitate the entry and removal of the portable electronic device from the stand while the device is connected to a cord such as a power source. In the embodiment in FIG. 6 the opening channel (5) is disposed in the middle of faces B, C and D, created to allow wire management and the inclusion of a view Adjustor (2). Face E has a wider opening (4), to accommodate a Dock Connector (3), a terminus of the power cord attached to the electronic device. The length of the channel can be from about 3 inches to about 6 inches and the width of the channel may be from about ⅛ inches to about ¾ inches. In a preferred embodiment the channel can be about 4.25 inches in length and the width of the channel may be about 0.25 inches. In a preferred embodiment the channels is approximately medial to the length of the stand but other configurations, which accommodate the electronic device and attached cords are also contemplated.

The stands of the present invention can be manufactured in various ways including, but not limited to machining, bending flat metal stock, molding and machine extrusion. Metal flat stock may punched or laser cut and then bent in making the stands of the present invention. Similarly, the devices of the present invention can be made using plastic or composite materials and among other manufacturing methods it be bent, molded or extruded.

The stands of the present invention may be coated in various ways including anodized, powder coating and can be provided in various colors.

Figure 8:
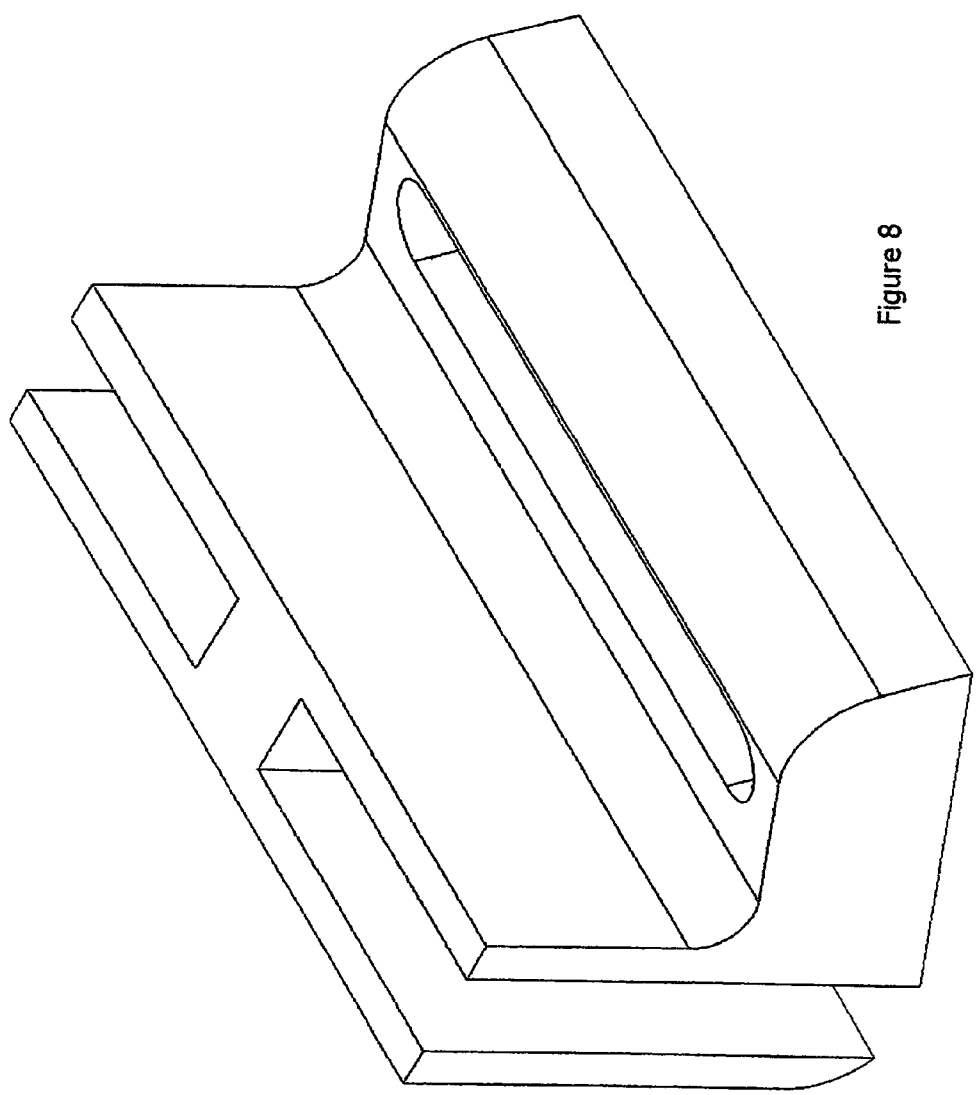
FIG. 8 illustrates a side view of one embodiment dock connector.
Figure 10:
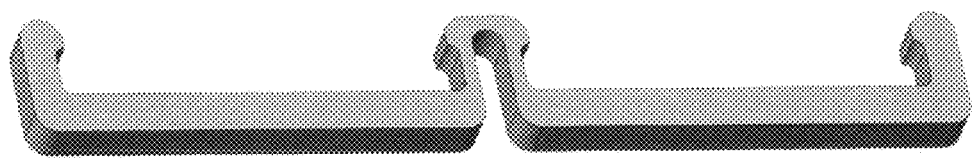
FIG. 10 illustrates one embodiment of a double view adjustor without the optional wire holder.
Figure 16:
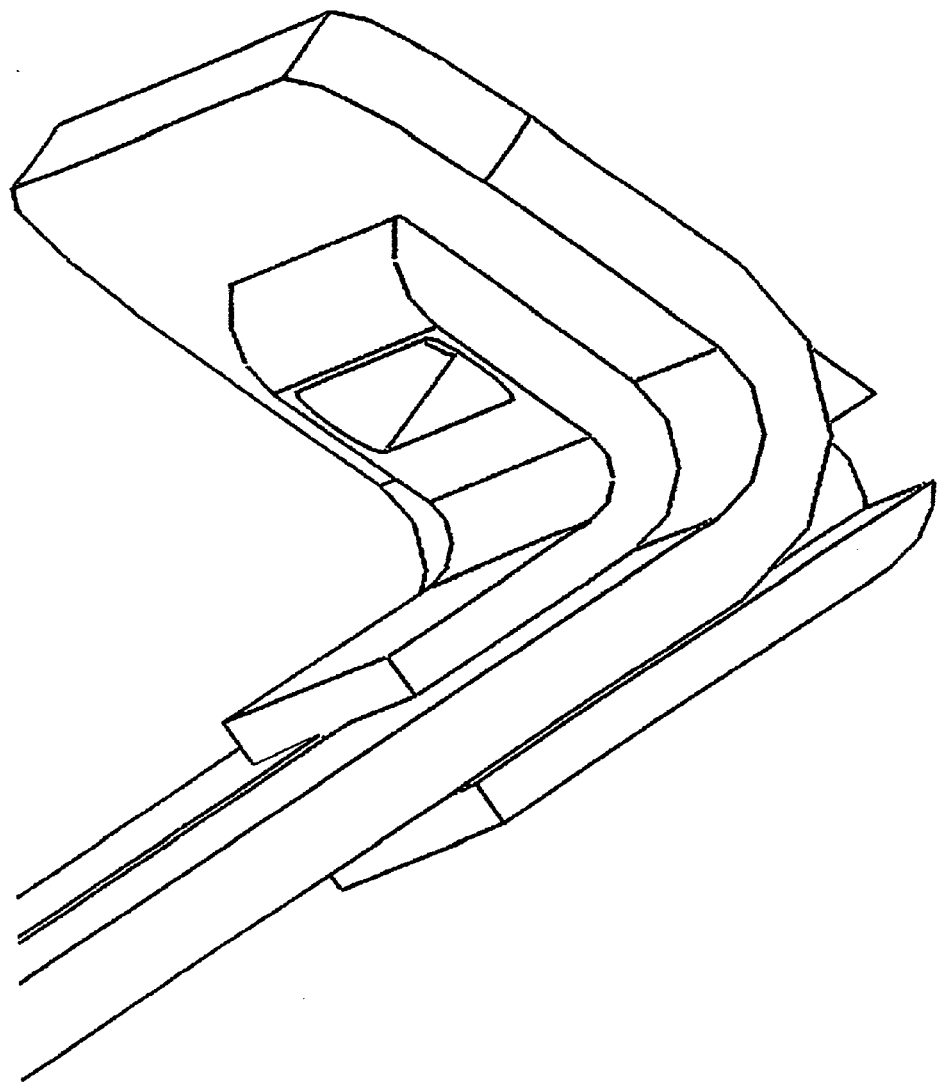
FIG. 16 illustrates a side view of one embodiment of the stand and the dock connector after insertion of the dock connector into the stand.
Figure 17:
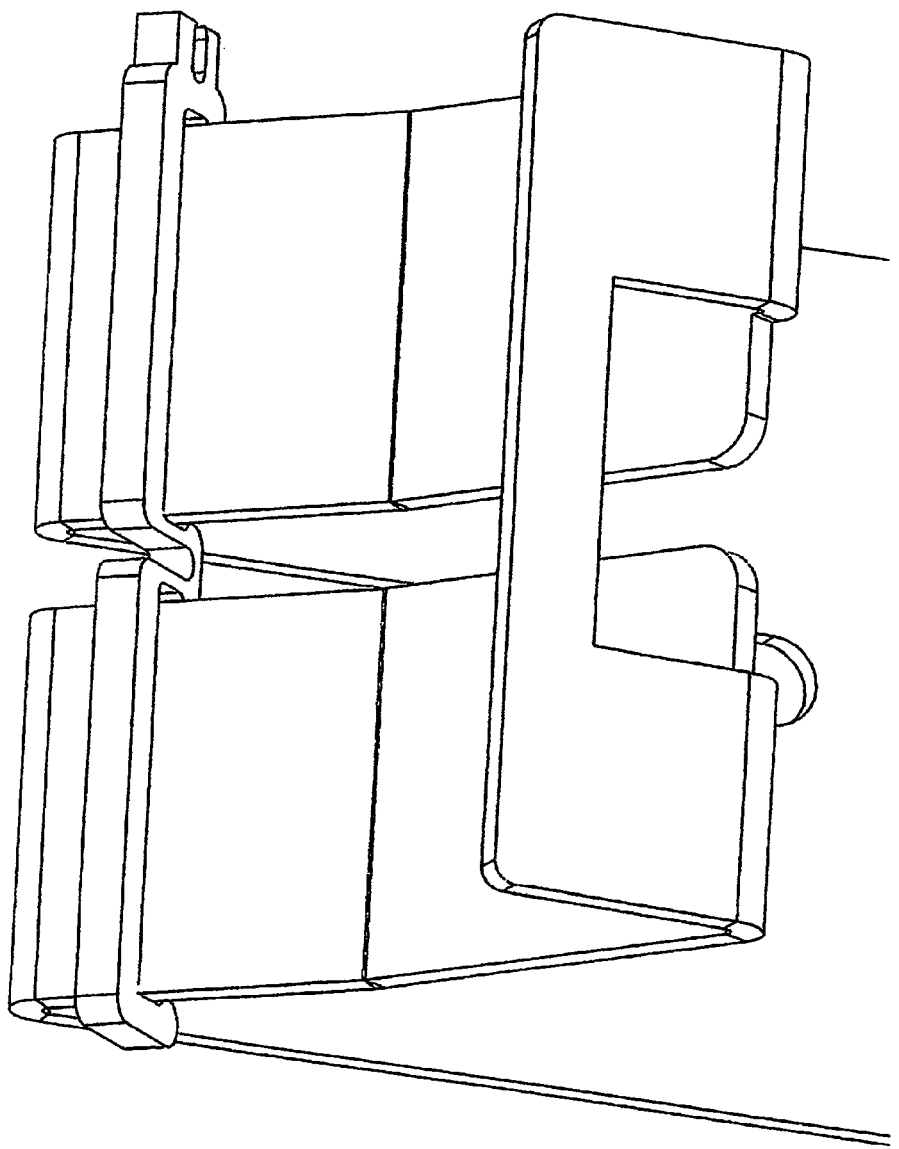
FIG. 17 illustrates a front view of one embodiment of the stand with a single view adjustor with wire holder.

Optionally, the stands may include a view adjuster. A view adjuster is a device that can be attached to the stand to increase or decrease the view angle of the portable electronic device resting on the stand. The view adjuster can change the viewing angle based on the height to which the view adjustor insert is raised on the stand and it's the thickness of the view adjuster. For example, placing the view adjustor on the bend between face C and D (as shown in FIG. 1) minimizes the effect of the view adjustor. Moving the view adjustor up the surface of face C (FIG. 1) forces the portable electronic device resting in the stand to become more perpendicular. Conversely, moving the view adjustor down surface D (FIG. 1) makes any inserted device more horizontal. As a preferred embodiment of the stand has a channel disposed along the midline of faces C and D, the view adjusters may be single or double. A single view adjuster, as shown in FIGS. 8 and 16, attaches to one side of the faces where the electronic device rests. A single view adjuster may be placed on either side the wire management channel or as in FIG. 19, two single view adjusters may be attached to the stand, one on either side of the wire management channel. A double view adjuster, as shown in FIGS. 10, 16 and 17, preferably spans the width of the stand and has an indentation in the middle of the view adjuster such that the double view adjuster may fit into the wire management channel and also accommodate a wire or connector from a portable electronic device rested in the stand. In preferred embodiments of both the single and double view adjuster an outer portion of the adjuster is constructed such that it will slide along the face(s) where the electronic device resides in the stand. As shown in FIGS. 10, 17, 18 and 19 the view adjuster is curved at the ends such that the adjuster will wrap around the face of the stand such that it can be moved comfortable up and down the face.

In preferred embodiments the view adjusters are made of metal, composite material, plastic or rubber. They can be manufactured by machining, molding, extrusion and other manufacturing methods.

Figure 11:
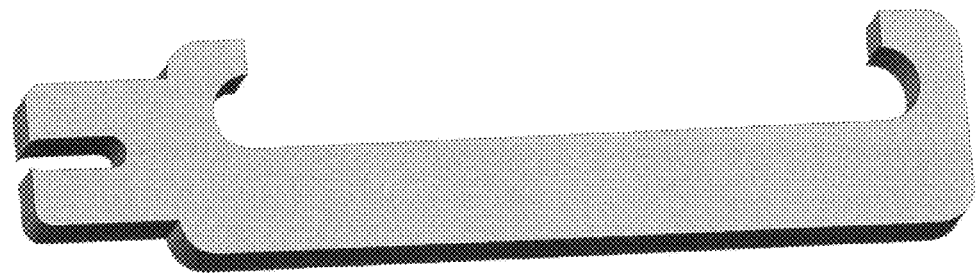
FIG. 11 illustrates one embodiment of a single view adjustor with a wire holder.
Figure 12:
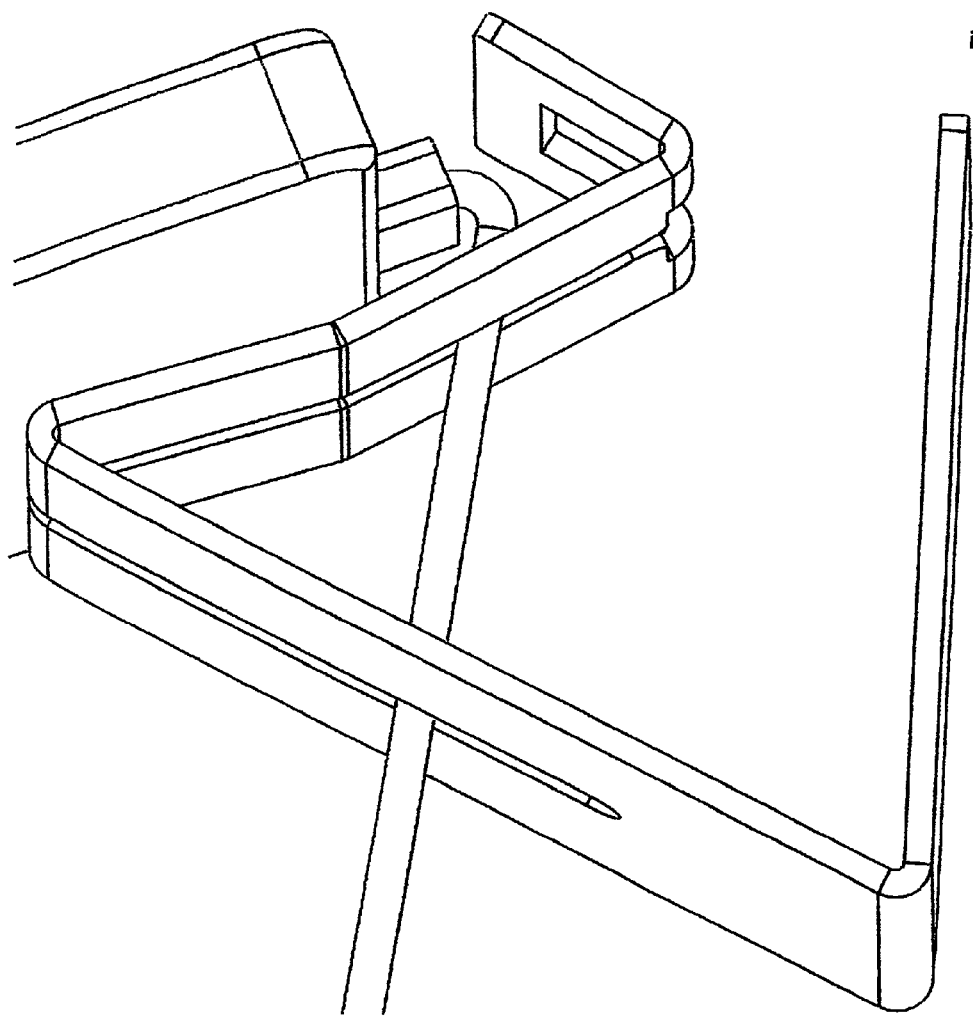
FIG. 12 illustrates a side view of one embodiment of the stand which depicts the use of the "hands free" wire management system.
Figure 13:
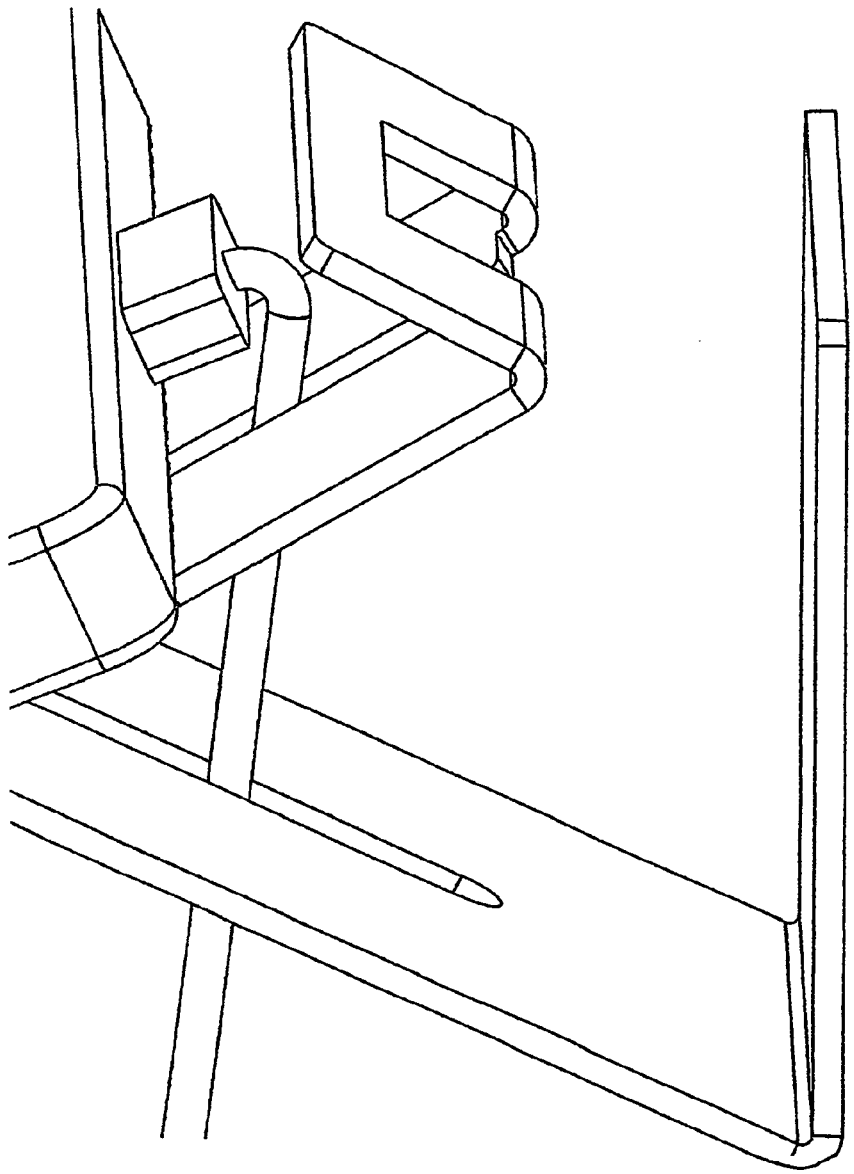
FIG. 13 illustrates a front view of one embodiment of the stand which depicts the use of the "hands free" wire management system.

FIG. 10 illustrates one embodiment of the view adjuster. The omega view adjustor is a double sided adjustor, which a single piece is covering both sides of the dock when inserted. The center of the omega view adjuster fits into the T slot of the dock and allows any wires to be managed by the Hands Free wire management. An optional wire holder can be added to the omega view adjustor as shown in FIG. 11.

The function of the wire holder is to hold any additional wire that may be used with the device, such as power or speaker, microphone, headset etc.

FIG. 17 illustrates the use of a view adjustor, which can slide up and down the dock thereby increasing or decreasing the viewing angle of the device. A view adjustor is inserted at the widest area of the T cutout. Sliding it on the back of the stand takes the view adjuster out of the way of the electronic device without removing the view adjuster.

Figure 18:
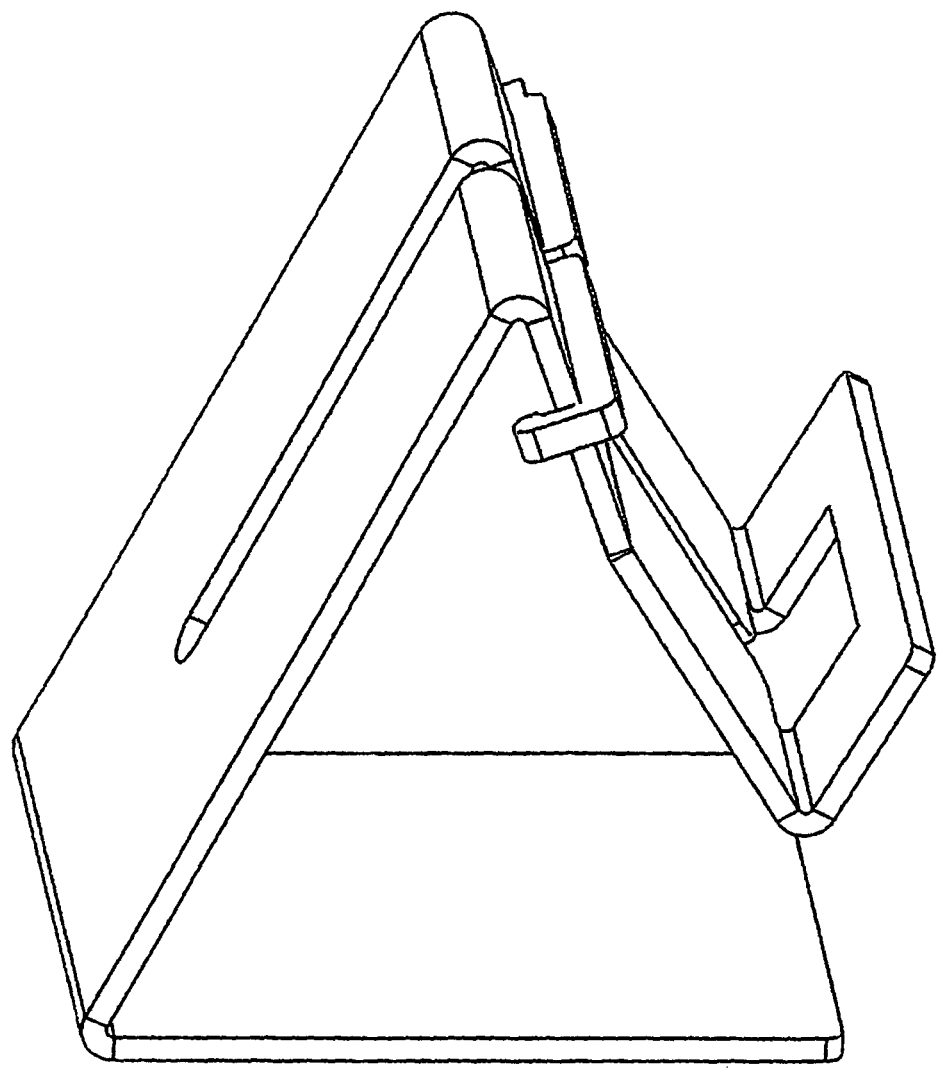
FIG. 18 illustrates a side view of one embodiment of the stand with a single view adjustor with wire holder.
Figure 19:
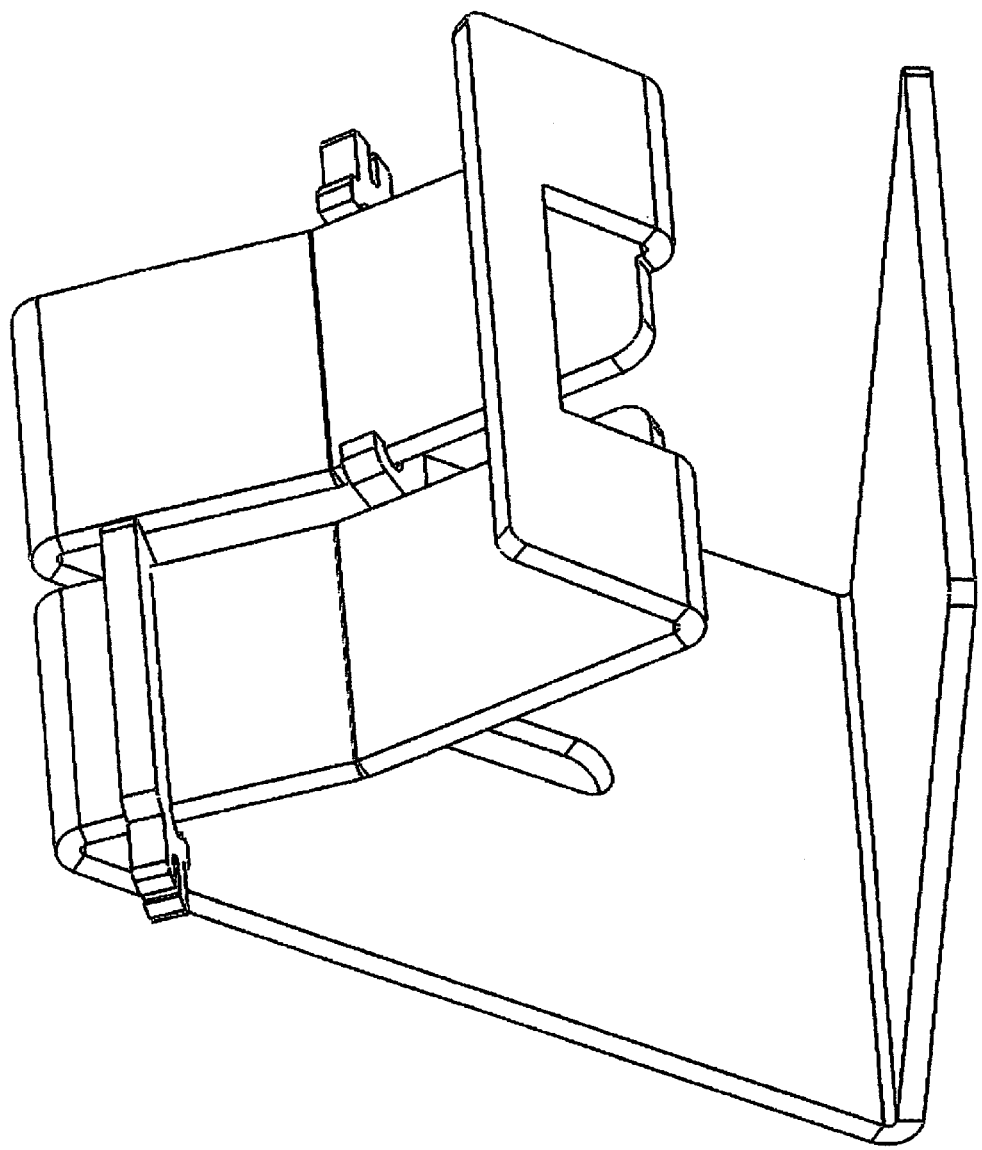
FIG. 19 illustrates a front view of one embodiment of the stand with a double view adjustor without wire management.

FIGS. 18 and 19 illustrate the utilization of the single view adjustors. One advantage of utilizing the single view adjustors is the unobstructed utilization of the hands free wire management This adjuster can also be used as an auxiliary wire holder without modifying the devices viewing angle, as shown on the right side of FIG. 19.

Optionally, the present invention may include a dock connector which can be inserted into the end wire management channel to provide an insertion porthole for the power connector of a give portable electronic device to be rested in the stand. This auxiliary device accepts a cable and by sliding it into the bottom of the cradle area of the stand converts the stand into a wire connected dock.

In preferred embodiments the dock connector is made of metal, composite material, plastic or rubber. They can be manufactured by machining, molding, extrusion and other manufacturing methods.

Figure 9:
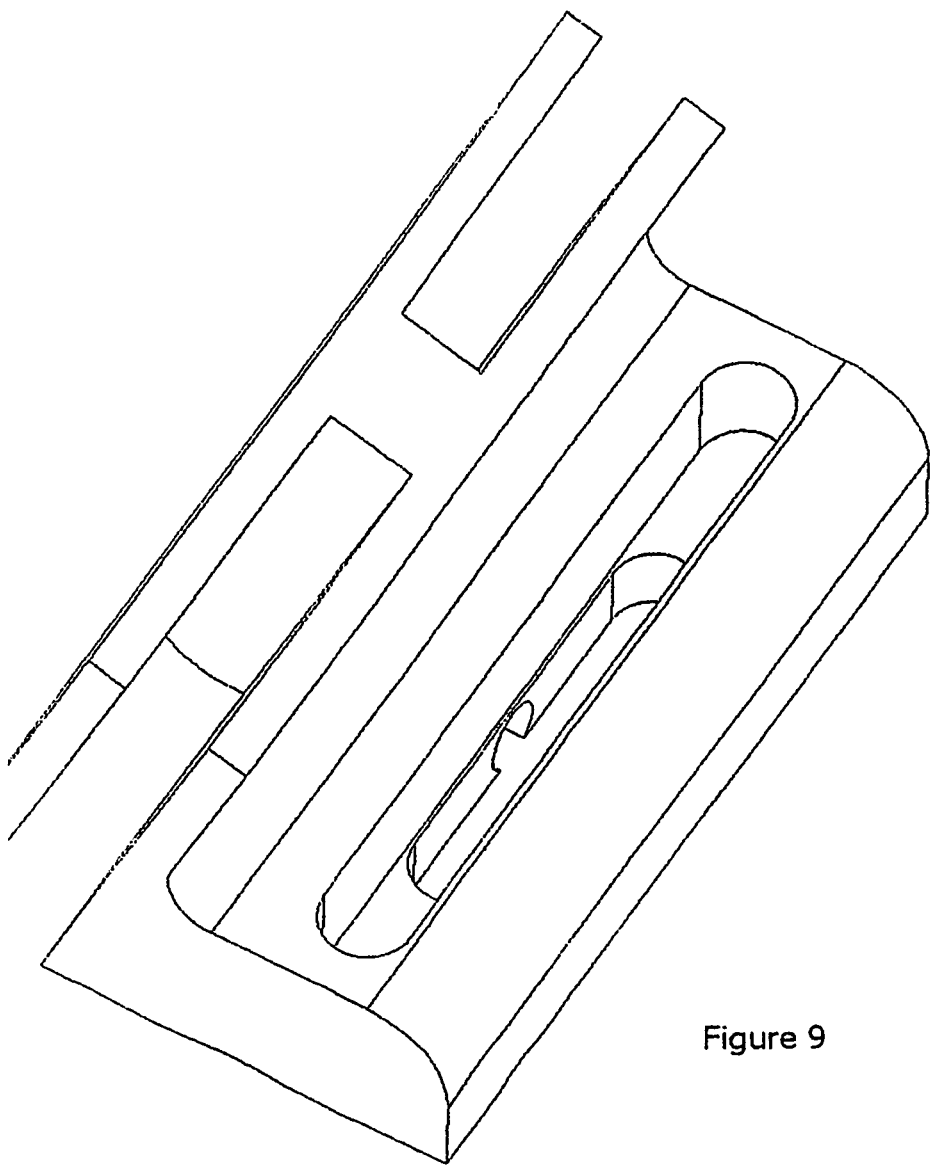
FIG. 9 illustrates a top view of one embodiment dock connector

FIGS. 8 and 9 illustrate the dock connector. FIG. 9 illustrates the cut out area where a cable can be attached. The wire can optionally be inserted into the slot provided at the bottom as shown in FIG. 9.

Figure 15:
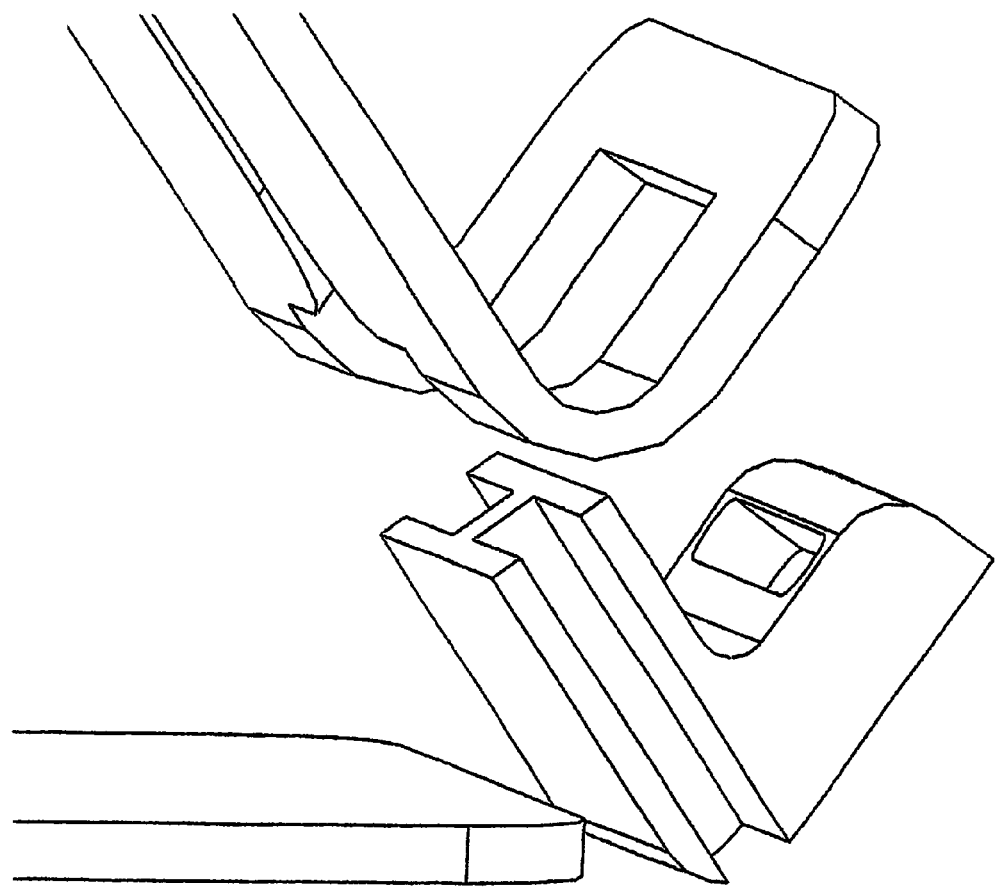
FIG. 15 illustrates a side view of one embodiment of the stand and the dock connector prior to insertion of the dock connector into the stand.

FIG. 15 depicts the dock connector being inserted into the dock. In a preferred embodiment of the dock connector this is accomplished by utilizing an H channel feature of the dock connector and the T shaped hands free wire management slot of the dock.

FIG. 16 depicts a connected dock connector. Addition of the dock connector to the stand converts into a dock with integrated wiring.

The dock connector can be customized made to better accept and utilize cables for specific devices.

Figure 20:
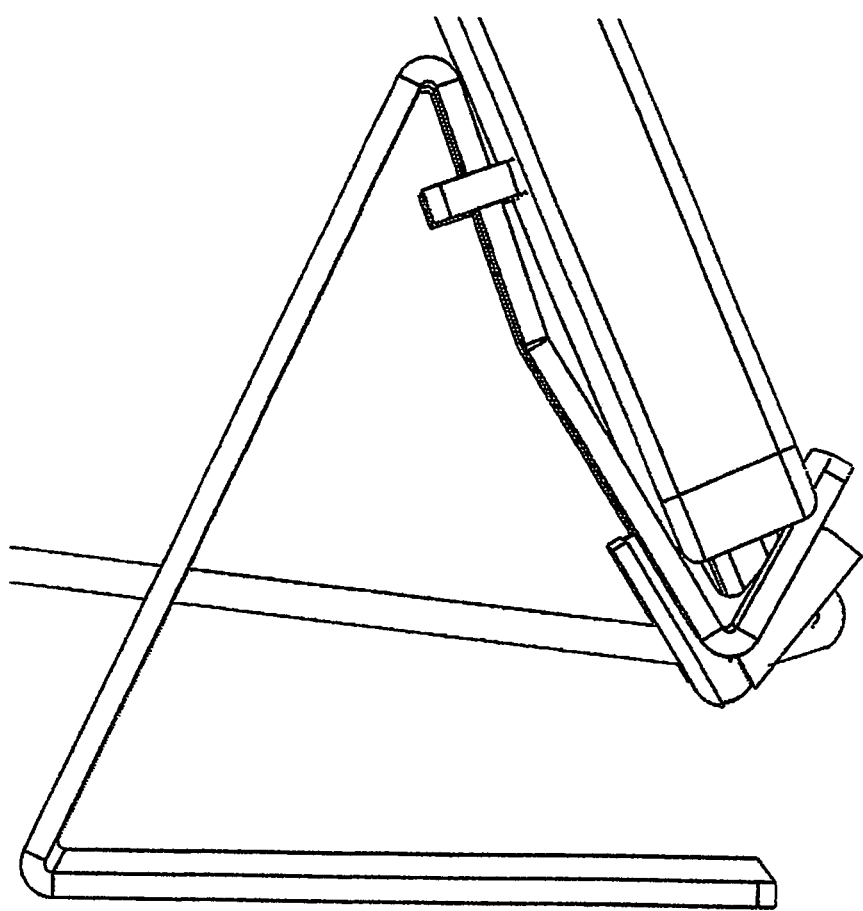
FIG. 20 illustrates a side view of one embodiment of the dock, with hands free wire management, view adjustor and dock connector.
Figure 21:
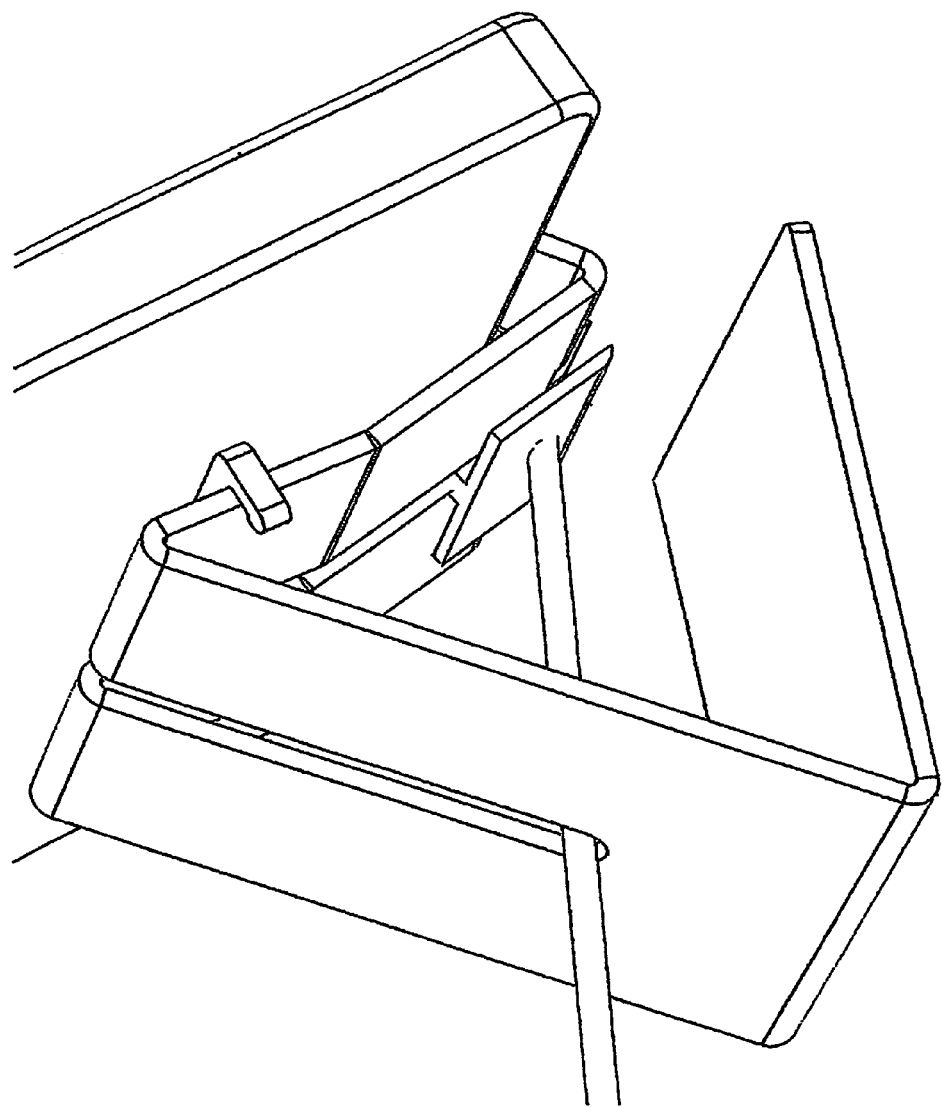
FIG. 21 illustrates a rear view of one embodiment of the dock, with hands free wire management, view adjustor and dock connector.

FIGS. 19 and 20 illustrate the dock with a View Adjustor and a Dock Connector. It also depicts the utilization of the hands free wire management.

Figure 22:
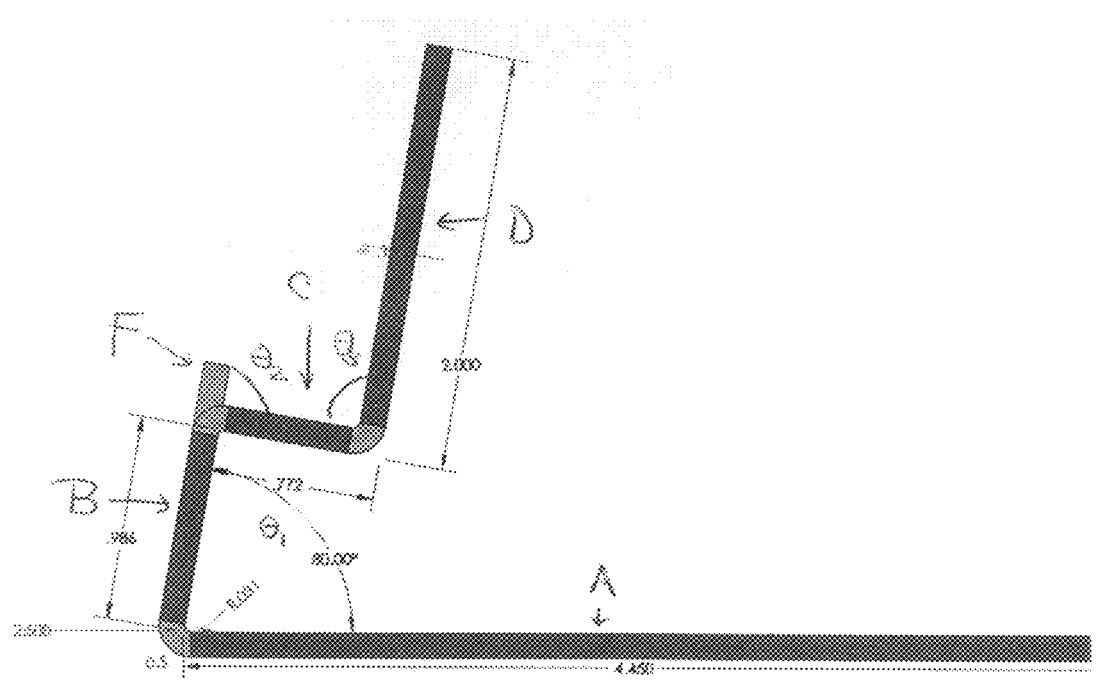
FIG. 22 is a schematic of a side view of one embodiment of the dock with an enlarged base.
Figure 23:
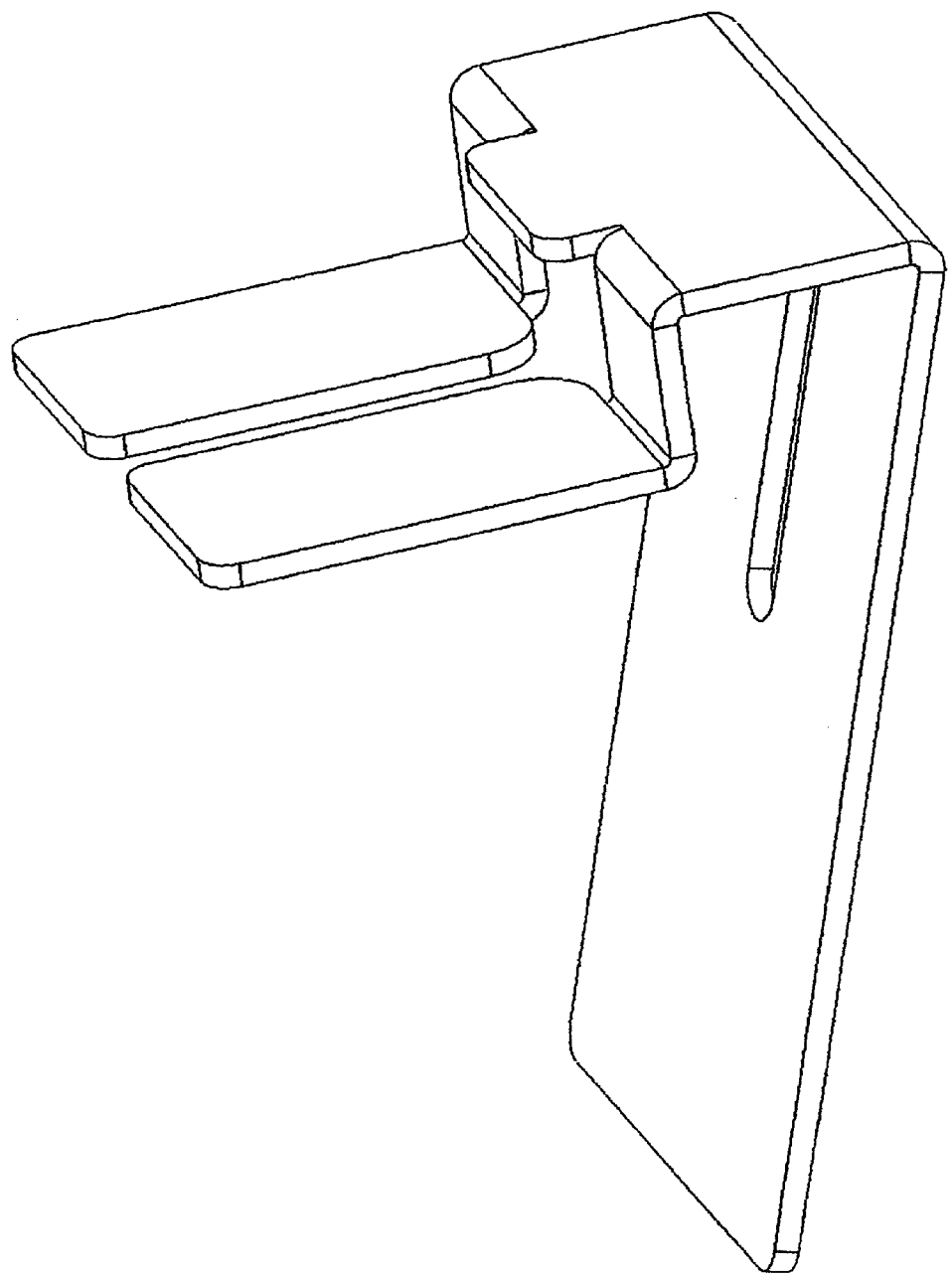
FIG. 23 illustrates a front view of one embodiment of the dock with an enlarged base.
Figure 24:
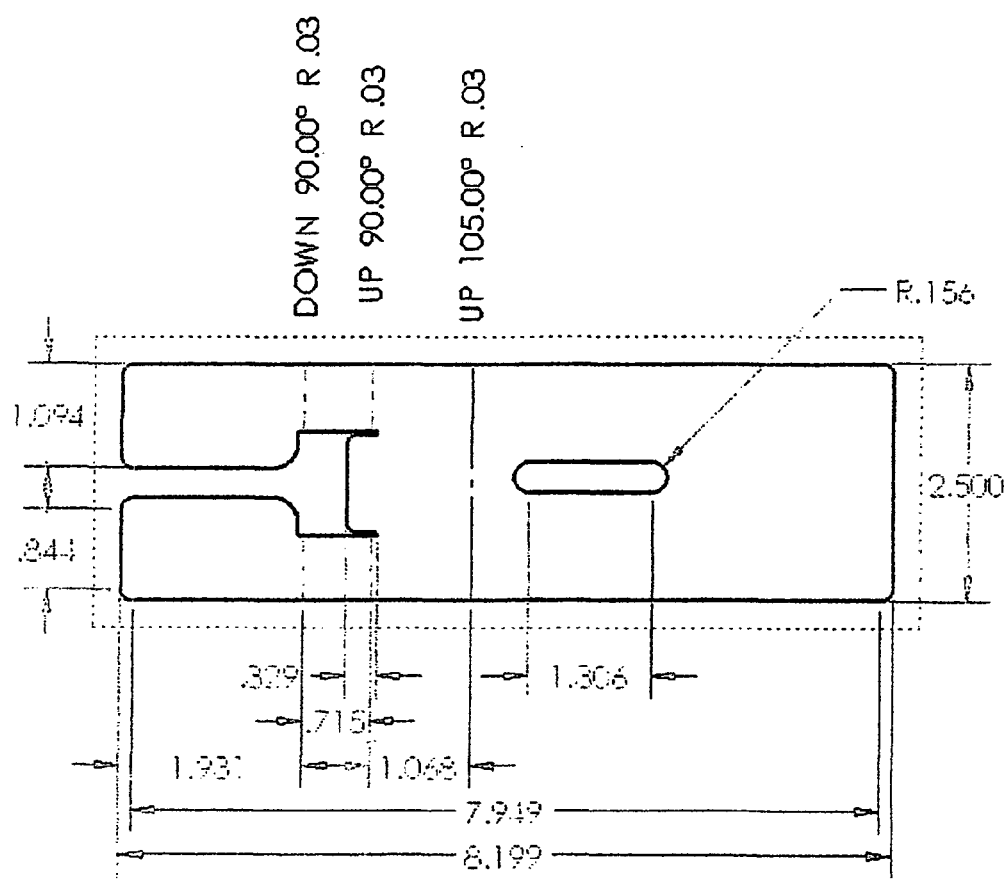
FIG. 24 illustrates a top view of one embodiment of the dock with an enlarged base before the dock is folded.
Figure 25:
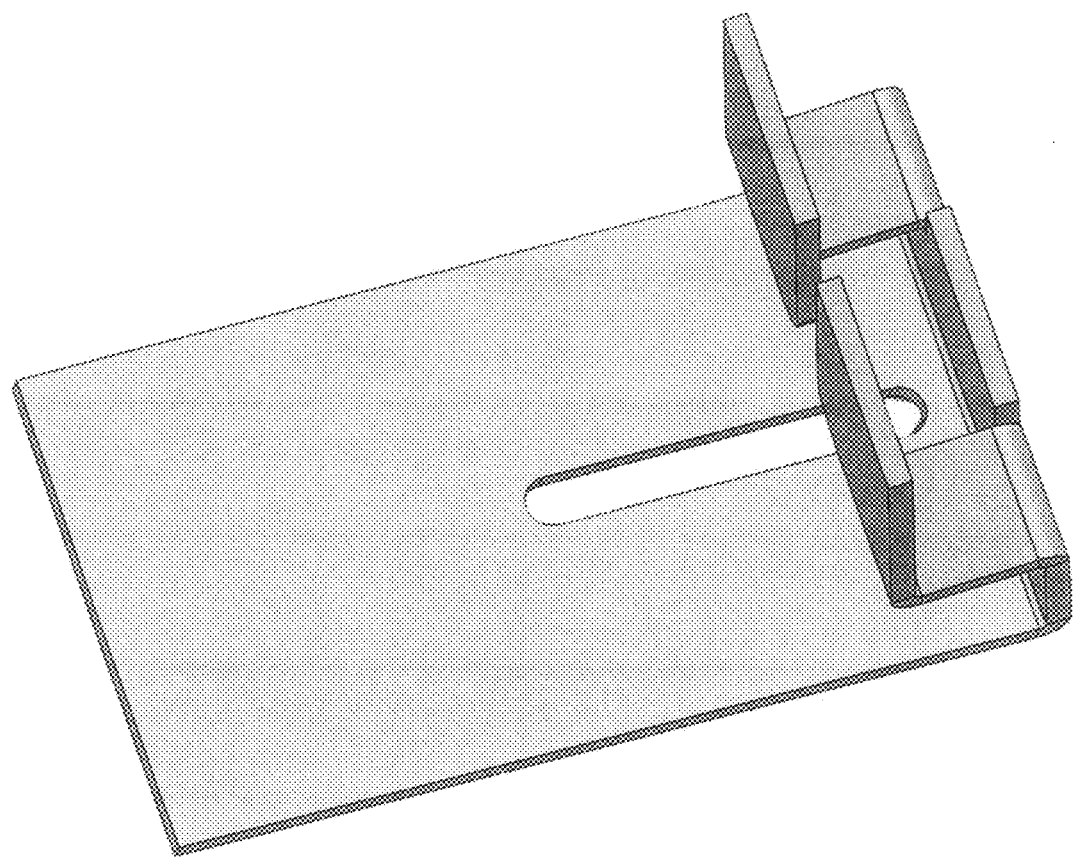
FIG. 25 illustrates a top view of one embodiment of the dock with an enlarged base.

FIGS. 22-25 illustrate another embodiment of the dock with an enlarged base and a modified wire management channel. In this embodiment there are only four faces to the dock. Referring to FIG. 22, the first face A serves as the base of the stand. Face B is the front of the stand and is contiguous with face A. Face B describes an angle $\theta_1$ relative to face A and is from about 65 degrees to about 85 degrees relative to the face A. Faces C and D serve as the portion of the stand on which the portable electronic device is placed. Face C is contiguous with face B and describes an angle $\theta_2$ of about 75 degrees to about 90 degrees relative to face B. Face D is contiguous with face C and describes an angle $\theta_3$ of about 75 degrees to about 90 degrees relative to face C. Face C serves to keep the portable electronic device resident in the stand from sliding off the stand and face D allows the back of the electronic device to rest against it. The angle between face C and face D can be adjusted accordingly.

In the embodiment illustrated in FIGS. 22-25 the wire management channel splits face C and face D of the dock into two separate and approximately equal halves. In addition face B has a flange (F) that extends above the wire management channel in face C such that the portable electronic device resting on face C will not slip and fall from the dock. While the dimensions of the dock may vary according to the uses for which the dock is designed in the embodiment illustrated in FIG. 22 the base, face A, is approximately 4.5 inches in length, the front face, B, is approximately 1 inch in length, the resting face, C, is approximately ¾ of an inch in length and the length of face D is approximately 2 inches. The width of each of the faces of the dock is approximately 2.5 inches. In the embodiment described in FIG. 22, $\theta_1$ is about 80 degrees $\theta_2$ is about 90 degrees and $\theta_3$ is about 90 degrees.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

The invention claimed is:

1. A stand for portable electronic devices comprising:
a single piece of metal, composite or plastic having a length about 7.5 inches to about 12 inches, a width of about 1.5 inches to about 5 inches and a thickness of from about 1/16 inches to about ⅜ inches, wherein the piece of metal, composite or plastic is bent or curved such that the piece of metal, composite or plastic defines five faces, face A, face B, face C, face D, and face E, wherein face B is contiguous with face A and face B describes an angle $\theta$ relative to face A, wherein angle $\theta$ is about 45 degrees to about 70 degrees, and wherein face C is contiguous with face B and describes an angle $\theta_2$ relative to face C, wherein the angle $\theta_2$ is about 35 degrees to about 70 degrees, and wherein Face D is contiguous with face C and describes an angle $\theta_3$ relative to face C, wherein the angle $\theta_{23}$ is about 150 degrees to about 180 degrees and wherein Face E is contiguous with face D and describes an angle $\theta_4$ relative to face D, wherein the angle $\theta_{24}$ is about 45 degrees to about 70 degrees wherein a wire management channel is medially disposed in faces B, E, C and D.

2. The stand of claim 1 further comprising a removable dock connector.

3. The stand of claim 1 further comprising a removable view adjustor.

4. The stand of claim 1 wherein angle $\theta$ is about 60 degrees, angle $\theta_2$ is about 42 degrees, angle $\theta_3$ is about 164 degrees, angle $\theta_4$ is about 60 degrees and the length of the piece of metal, composite or plastic is about 8.8 inches and the width of the piece of metal, composite or plastic is about 2.5 inches.

5. The stand of claim 4 wherein the wire management channel is from about 3 inches to about 6 inches in length and from about ⅛ to about ¾ of an inch in width.

6. The stand of claim 5 wherein the wire management channel is about 4.25 inches in length.

7. The stand of claim 6 wherein the wire management channel is about ⅛ inch in width.

8. The stand of claim 1, wherein the channel in face E is wider than the channel in faces B, C and D.

9. The stand of claim 8, wherein the wire management channel in face E is about 1 inch in width.

10. A stand for portable electronic devices comprising a stand wherein a wire management channel is medially disposed therein.

11. The stand of claim 1 wherein the stand is made of metal.

* * * * *